(12) United States Patent
Yaghmai (10) Patent No.: US 8,184,188 B2
(45) Date of Patent: May 22, 2012

(54) METHODS AND APPARATUS FOR HIGH DYNAMIC OPERATION OF A PIXEL CELL

(75) Inventor: Sohrab Yaghmai, Oslo (NO)

(73) Assignee: Micron Technology, Inc., Boise, ID (US)

(*) Notice: Subject to any disclaimer, the term of this patent is extended or adjusted under 35 U.S.C. 154(b) by 598 days.

(21) Appl. No.: 12/402,933

(22) Filed: Mar. 12, 2009

(65) Prior Publication Data

US 2010/0231771 A1    Sep. 16, 2010

(51) Int. Cl.
*H04N 5/335* (2006.01)
(52) U.S. Cl. ........................ 348/308; 294/297
(58) Field of Classification Search ............. 348/296, 348/297, 308, 362; 257/292, 72
See application file for complete search history.

(56) References Cited

U.S. PATENT DOCUMENTS

| | | | |
|---|---|---|---|
| 6,859,227 B1 | 2/2005 | Andersson et al. | 348/241 |
| 7,196,304 B2 | 3/2007 | Altice, Jr. et al. | 250/208.1 |
| 7,238,977 B2 * | 7/2007 | Hong et al. | 257/292 |
| 7,339,217 B2 | 3/2008 | Rhodes | 257/292 |
| 7,344,910 B2 | 3/2008 | Rhodes | 438/57 |
| 7,345,330 B2 | 3/2008 | Rhodes | 257/292 |
| 7,362,365 B1 | 4/2008 | Reyneri et al. | 348/308 |
| 7,420,154 B2 * | 9/2008 | Shah | 250/214.1 |
| 7,514,716 B2 * | 4/2009 | Panicacci | 257/72 |
| 2005/0040393 A1 | 2/2005 | Hong | 257/40 |
| 2006/0082667 A1 | 4/2006 | Rhodes | 348/308 |
| 2007/0221823 A1 | 9/2007 | Xu et al. | 250/208.1 |
| 2008/0074523 A1 | 3/2008 | Panicacci | 257/72 |

* cited by examiner

*Primary Examiner* — Mohammed Hasan
(74) *Attorney, Agent, or Firm* — Dickstein Shapiro LLP (57) ABSTRACT

A pixel circuit providing high dynamic operation, and methods of operating the pixel circuit providing for high dynamic operation. Methods include a lateral overflow and a double exposure mode, and a pixel output signal is determined according to whether a photosensor of the pixel circuit is saturated.

39 Claims, 9 Drawing Sheets

METHODS AND APPARATUS FOR HIGH DYNAMIC OPERATION OF A PIXEL CELL

FIELD OF THE INVENTION

Embodiments described herein relate generally to imaging devices, and more particularly to methods and apparatus for providing high-dynamic operation of an imaging device.

BACKGROUND

Many portable electronic devices such as cameras, cellular telephones, personal digital assistants (PDAs), MP3 players, computers and other devices include an imager for capturing images. One example of an imager is a complementary metal-oxide semiconductor ("CMOS") imager. A CMOS imager includes a focal plane array of pixels, each one of the pixels including at least one photosensor overlying a substrate for accumulating photo-generated charge in the underlying portion of the substrate. Each pixel may include at least one electronic device such as a transistor for transferring charge from the photosensor to a storage region.

Each pixel has corresponding readout circuitry that includes at least a charge storage region connected to the gate of the output transistor, an output source follower transistor, a reset transistor for resetting the charge storage region to a predetermined charge level, and a row control transistor for selectively connecting the readout circuitry to a column line. The charge storage region may be constructed as a floating diffusion region. Each pixel may have independent readout circuitry, or may employ common element pixel architecture (CEPA), that may include multiple pixels sharing a single set of readout circuitry.

A pixel (including a photosensor), and its corresponding readout circuitry, are herein collectively referred to as a "pixel circuit." In a CMOS imager, the active elements of a pixel circuit perform the necessary functions of: (1) photon to charge conversion; (2) accumulation of image charge; (3) resetting the storage region to a known state; (4) transfer of charge to the storage region accompanied by charge amplification; (5) selection of a pixel circuit for readout; and (6) output and amplification of a signal representing a reset level and pixel charge. Photo charge may be amplified when the charge moves from the initial charge accumulation region to the storage region. The charge at the storage region is typically converted to a pixel output voltage by a source follower output transistor.

Figure 1:
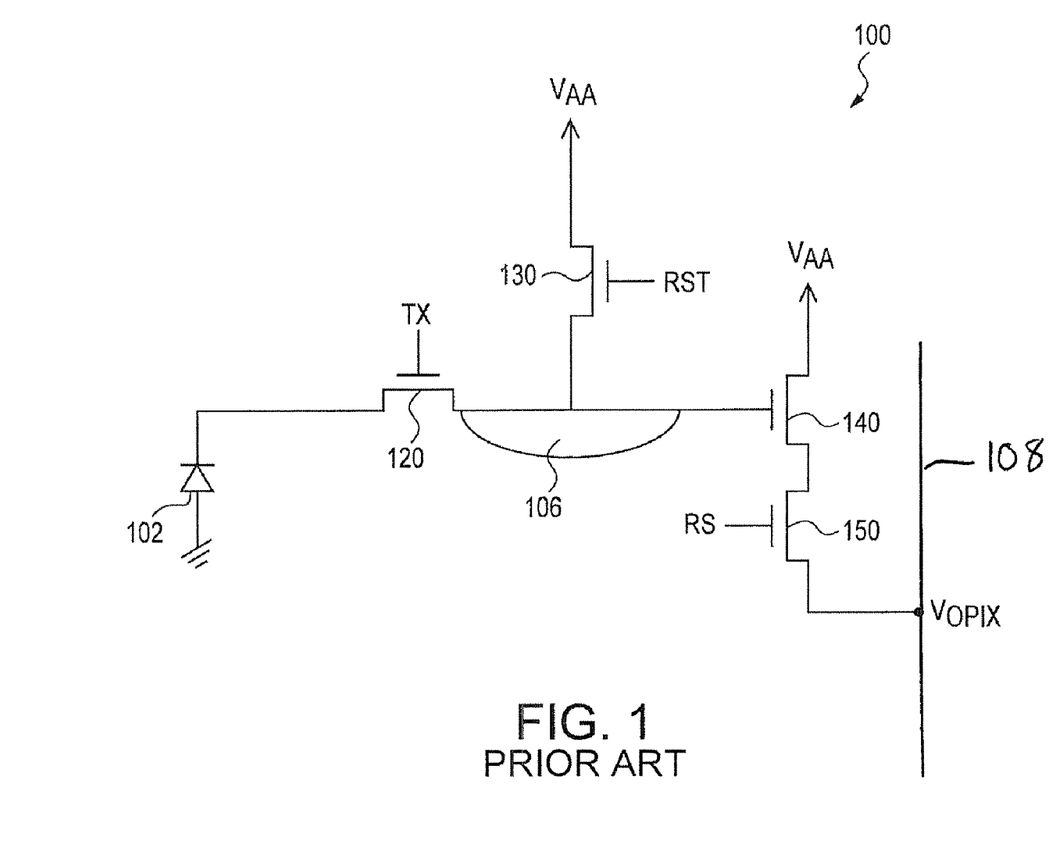
FIG. 1 shows a conventional 4T pixel circuit.

FIG. 1 illustrates a typical four-transistor (4T) pixel circuit 100 utilized in a pixel array of an imager, such as a CMOS imager. The pixel circuit 100 includes a pixel having a photosensor 102 (e.g., a photosensor, photodiode, photogate, or photoconductor) and a transfer transistor 120. Pixel circuit 100 also includes readout circuitry, including a storage region configured as a floating diffusion region 106, a reset transistor 130, a source follower transistor 140, and a row select transistor 150. The at least one photosensor 102 is connected to the floating diffusion region 106 by the transfer transistor 120 when the transfer transistor 120 is activated by a transfer control signal TX. The reset transistor 130 is connected between the floating diffusion region 106 and an array pixel supply voltage $V_{AA}$. A reset control signal RST is used to activate the reset transistor 130, which resets the floating diffusion region 106 to a predetermined reset voltage corresponding to the array pixel supply voltage $V_{AA}$, as is known in the art.

The source follower transistor 140 has its gate connected to the floating diffusion region 106 and is connected between the array pixel supply voltage $V_{AA}$ and the row select transistor 150. The source follower transistor 140 converts the charge stored at the floating diffusion region 106 into an electrical output signal. The row select transistor 150 is controllable by a row select signal RS for selectively outputting an output signal $V_{OPIX}$ from the source follower transistor 140 onto column line 108. In a CMOS imager, two output signals are conventionally generated for each pixel circuit; one being a reset signal $V_{OPIX\_RST}$ generated after the floating diffusion region 106 is reset, the other being an image or photo signal $V_{OPIX\_SIG}$ generated after charges are transferred from the photosensor 102 to the floating diffusion region 106. This process is commonly referred to as "correlated double sampling" or "CDS". Output signals $V_{OPIX\_RST}$, $V_{OPIX\_SIG}$ are selectively stored in a sample and hold circuit (not shown).

Image sensors, such as an image sensor employing the conventional pixel circuit 100, have a characteristic dynamic range. Dynamic range refers to the range of incident light that can be accommodated by an image sensor in a single frame of pixel data. It is desirable to have an image sensor with a high dynamic range to image scenes that generate high dynamic range incident signals, such as indoor rooms with windows to the outside, outdoor scenes with mixed shadows and bright sunshine, night-time scenes combining artificial lighting and shadows, and many others.

The dynamic range for an image sensor is commonly defined as the ratio of its largest non-saturating signal to the standard deviation of its noise under dark conditions. The dynamic range is limited on an upper end by the charge saturation level of the sensor, and on a lower end by noise imposed limitations and/or quantization limits of the analog-to-digital converter used to produce the digital image. When the dynamic range of an image sensor is too small to accommodate the variations in light intensities of the imaged scene, e.g. by having a low saturation level, image distortion may occur.

A problem associated with charge generation in conventional pixel circuits occurs when the incident light captured and converted into charge during an integration period is greater than the charge storage capacity of the photosensor. In the event that a photosensor of a pixel circuit is exposed to an amount of incident light that generates a charge that exceeds the capacity of the photosensor, any additional photon-to-charge conversion will require some charge leakage to escape the photodiode region 102. Often times this leakage causes charges to migrate to adjacent pixel circuits causing crosstalk.

Additionally, when the charges generated during an integration period are output from the photosensor during transfer to the floating diffusion region 106, a small amount of residual charge can remain in the photosensor. The residual charge causes charge accumulation excess in a subsequent captured image and may cause the photosensor to more quickly exceed its maximum capacity, thereby causing excess charge to overflow to adjacent pixels. This undesirable phenomenon of charge overflow at the photosensor is known as blooming and can result in a number of vertical and/or horizontal streaks in the resultant output image.

One solution that has been proposed to this blooming problem is a multiple exposure mode, where charge generated in a photosensor region during multiple exposure periods are sampled and combined. For example, a pixel can be operated in a double exposure mode, where a first charge V1 generated in a photosensor region (such as, for example, photodiode 102 of FIG. 1) during a first exposure period T1 is output via the pixel circuit's output circuitry during a first sampling operation. The photosensor region is then reset, and a second charge V2 generated in the photosensor region during a second exposure period T2 is output via the pixel circuit's output circuitry during a second sampling operation. While a multiple exposure operation allows for a higher dynamic range of pixel circuit 100, the multiple cycles of charge generation and sampling cause a reduced frame rate. Furthermore, line buffers to store the multiple sampled charges are required, resulting in a higher required die size and/or a lower fill-rate of the pixel circuit.

Yet another solution that has been proposed is a lateral overflow mode, where photo-generated charge is generated in a photoconversion region (such as, for example, photodiode 102), and if the photo-generated charge exceeds a predetermined threshold of the photoconversion region, an excess portion of the photo-generated charge is transferred to a floating diffusion region of the pixel circuit (for example, floating diffusion region 106 of FIG. 1) after a first exposure period T1. The excess portion may be transferred by applying a "soft transfer" signal to a gate of a transfer transistor separating the photoconversion region from the floating diffusion region (e.g., transfer transistor 120 of FIG. 1), where the soft transfer signal is a voltage that is less than the voltage required to completely transfer charge across the transfer transistor.

The excess charge may be discarded by resetting the floating diffusion region (such as by applying a reset signal to reset transistor 130 in FIG. 1), or, alternatively, may be sampled. The remaining charge generated during first exposure period T1, as well as any additional charge generated during a second exposure period T2, is transferred into the floating diffusion region and sampled to generate an output pixel signal $V_{OPIX\_SIG}$. Regardless of whether the excess charge V1 is discarded or sampled, to account for the excess charge, the output pixel signal $V_{OPIX\_SIG}$ must be calculated according to a "knee point" of the pixel circuit when operated in lateral overflow mode, the knee point being a factor of the soft-transfer signal and/or the resultant threshold voltage $V_{TH}$ of the transfer transistor. While a lateral transfer mode increases the dynamic range of the pixel, the knee point (correlating to the threshold voltage $V_{TH}$) of the pixel circuit must be calibrated, requiring an additional readout cycle of the pixel circuit, and thus resulting in a reduced frame rate and/or added noise.

Figure 2:
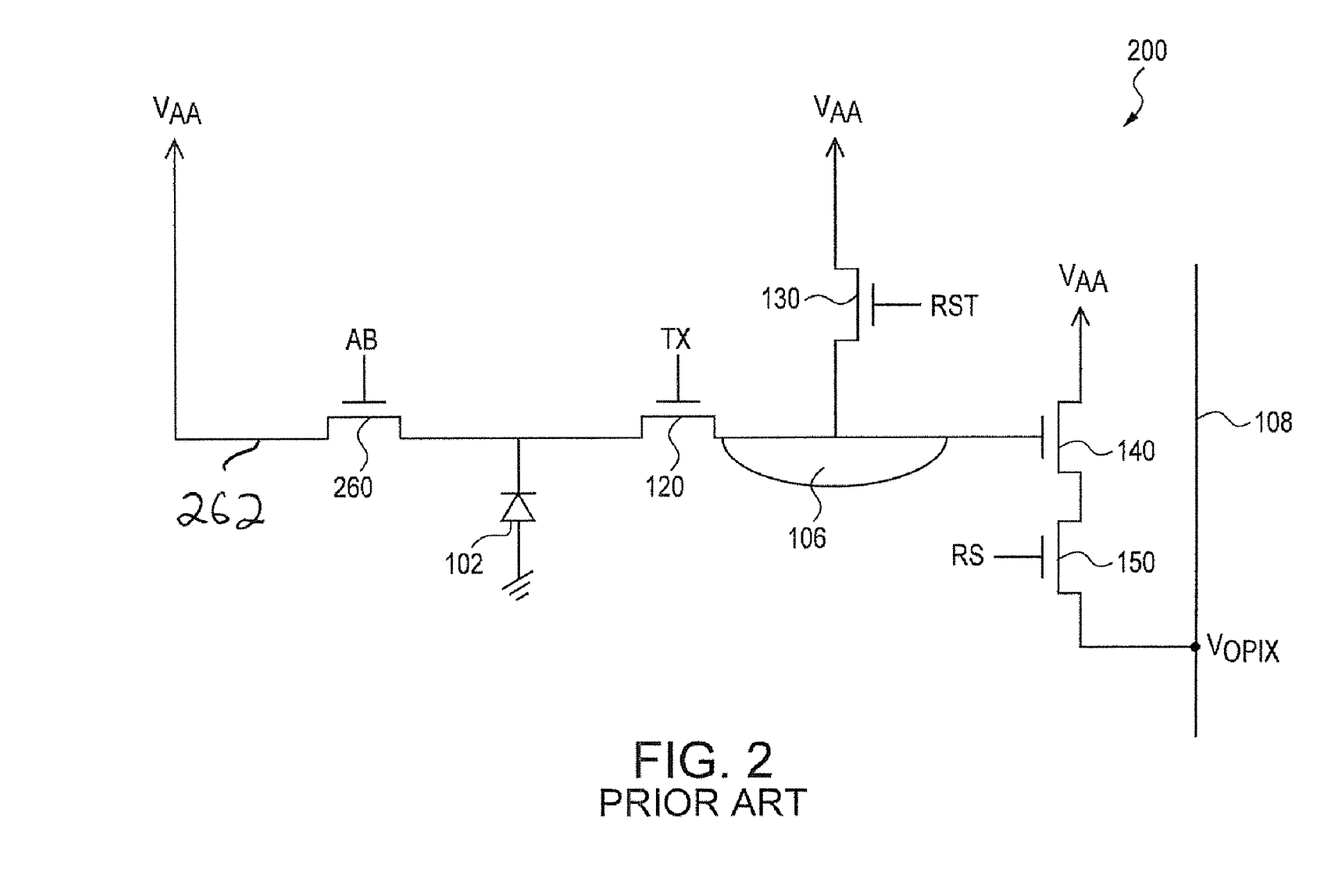
FIG. 2 shows a conventional 5T pixel circuit having an anti-blooming transistor.

Yet another solution that has been suggested to overcome the above problems, as shown in FIG. 2 and as described, for example, in U.S. Pat. No. 7,238,977 B2, assigned to Micron Technology, Inc, the disclosure of which is incorporated herein by reference in its entirety, is to provide a pixel circuit 200 with an anti-blooming transistor 260. As shown in FIG. 2, pixel circuit 200 is similar to the 4T pixel circuit 100 of FIG. 1, but has an additional transistor 260. During an integration period for the pixel circuit 200, when the photoconversion region 102 (which may be any of a photosensor, photodiode, photogate, or photoconductor) becomes saturated with charge, the anti-blooming (AB) transistor 260 transfers some of the excess charge to a drain area 262 associated with the AB transistor 260. Drain area 262 may be, for example, connected to a pixel voltage $V_{AA}$, and the excess charge is discarded into the drain area 262 of the AB transistor 260 without being sampled. The proposed design of pixel circuit 200 is effective for increasing the dynamic range over the conventional pixel circuit 100 (FIG. 1), however, the proposed pixel circuit 200 also has drawbacks. Because the excess charge is not sampled, if it is to be accounted for at all, the read out voltage $V_{OPIX\_SIG}$ must account for the excess charge transferred across drain area 262 of the AB transistor 260. CMOS transistors, such as AB transistor 260, have a high deviation in threshold voltage from wafer to wafer, and often from transistor to transistor. This deviation leads to an uncertainty in the amount of charge stored from pixel circuit to pixel circuit since the threshold voltage of each transistor, including the anti-blooming transistor, could vary. The variance of charge storage from pixel circuit to pixel circuit leads to fixed pattern noise (FPN) in an imager array resulting in diminished image quality because of the non-uniformity of barrier heights of the transistor 260 from pixel to pixel.

An optimal pixel circuit has a high dynamic range with a predictable response, a low die size and high fill-rate, potential for a high frame-rate, and low noise. There is needed, therefore, a pixel circuit having improved saturation response and lower potential for blooming, but with reduced potential for the other effects caused by the previously proposed solutions described above.

DETAILED DESCRIPTION OF THE INVENTION

In the following detailed description, reference is made to various specific embodiments in which the invention may be practiced. These embodiments are described with sufficient detail to enable those skilled in the art to practice the invention, and it is to be understood that other embodiments may be employed, and that structural and logical changes may be made without departing from the spirit or scope of the present invention.

The present disclosure includes embodiments of a pixel circuit configured for improved high-dynamic range operation. The pixel circuit, and methods of operating the pixel circuit described herein, provide for increased dynamic range by sampling a photo-generated charge that may be in excess of a capacity of a photoconversion region, while not requiring threshold calibration, as required in the above-described lateral overflow mode, or additional line buffers or multiple non-overlapping sampling periods, as required in the above-described double exposure mode. Embodiments include a pixel circuit having a storage region between the photoconversion region and another storage region configured to be connected by a storage transistor, and methods of operating the pixel circuit in lateral overflow and double exposure modes.

Figure 3:
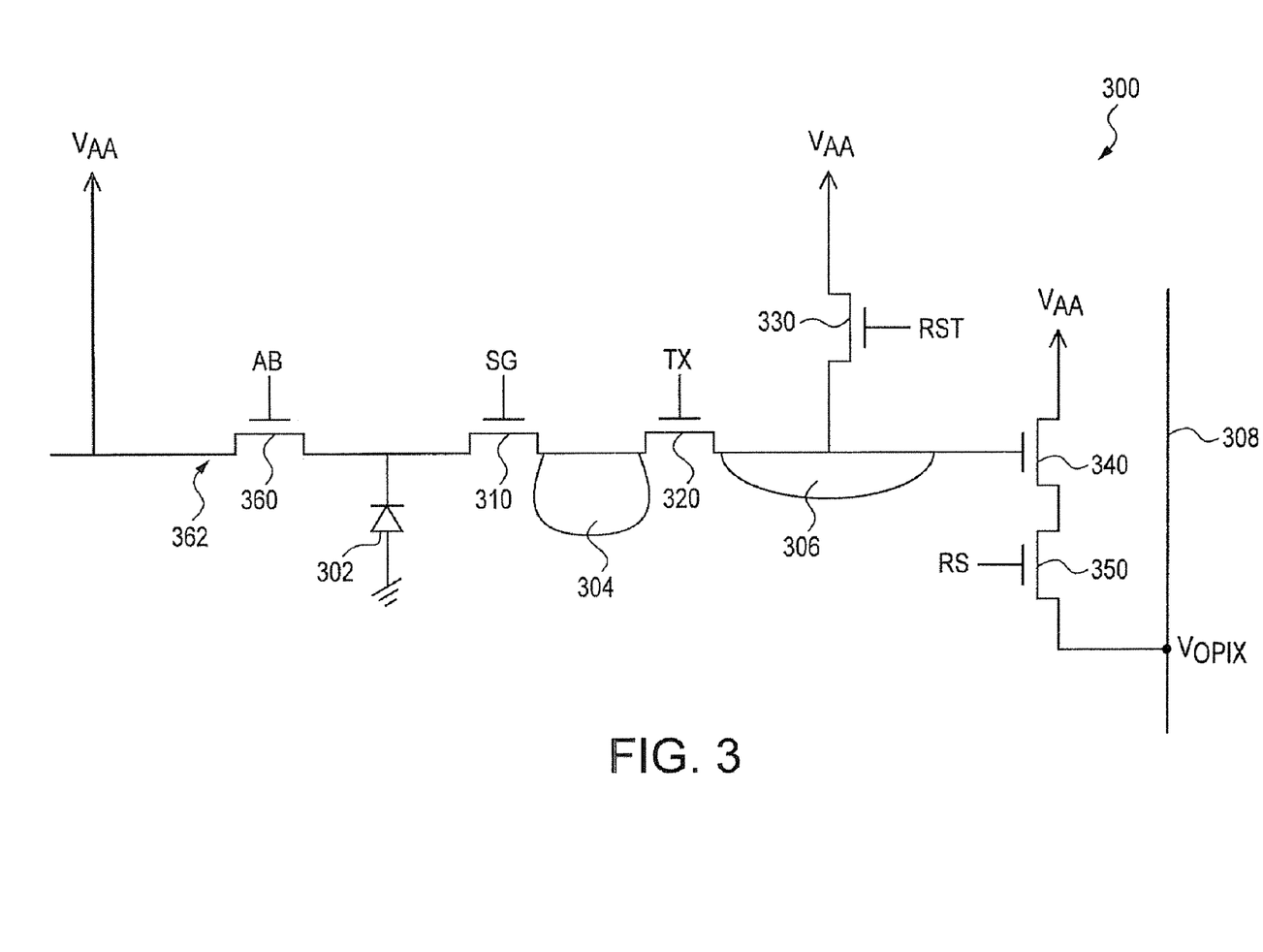
FIG. 3 shows a pixel circuit having a storage transistor and an optional anti-blooming transistor configured to be operated in accordance with embodiments described herein.

FIG. 3. shows a pixel circuit 300 configured for operation in accordance with embodiments described herein. Pixel circuit 300 includes a photosensor 302 (e.g., a photosensor, photodiode, photogate, or photoconductor) and a transfer transistor 320. Pixel circuit 300 also includes readout circuitry, including a readout storage region configured as a floating diffusion region 306, a reset transistor 330, a source follower transistor 340, and a row select transistor 350. Pixel circuit 300 also includes a storage region 304 for storing photo-generated charge from photosensor 302. Pixel circuit 300 can also include an anti-blooming transistor 360 connecting photosensor 302 to an anti-blooming drain region 362 when an anti-blooming signal is applied to the gate AB of anti-blooming transistor 360. The anti-blooming drain region 362 may be connected to an array pixel supply voltage $V_{AA}$, or another voltage that is opposite in charge to the photo-generated charge generated in photosensor 302.

Storage region 304 is separated from photosensor 302 by storage transistor 310, which may be configured as a global shutter transistor. Photosensor 302 is connected to storage region 304 when the storage transistor 310 is activated by a storage control signal applied to gate SG. Gate SG of storage transistor 310 may be configured as a global shutter gate, in which all shutter gates 310 of all pixels of an array are operated at the same time. The storage region 304 is connected to the floating diffusion region 306 by the transfer transistor 320 when the transfer transistor 320 is activated by a transfer control signal applied to gate TX. The reset transistor 330 is connected between the floating diffusion region 306 and array pixel supply voltage $V_{AA}$. A reset control signal applied to gate RST is used to activate the reset transistor 330, which resets the floating diffusion region 306 to a known state (i.e., to a predetermined reset voltage corresponding to the array pixel supply voltage $V_{AA}$).

The source follower transistor 340 has its gate connected to the floating diffusion region 306 and is connected between the array pixel supply voltage $V_{AA}$ and the row select transistor 350. The source follower transistor 340 converts the charge stored at the floating diffusion region 306 into an electrical output signal. The row select transistor 350 is controllable by applying a row select signal to gate RS for selectively outputting the output signal $V_{OPIX}$ (which may include one or more of output signals $V_{OPIX\_1}$ or $V_{OPIX\_2}$ in the methods of operation described below) from the source follower transistor 340 onto column line 308. The output signal $V_{OPIX}$ on column line 308 may be sampled using "correlated double sampling" or "CDS", as is known in the art.

FIGS. 4-7 illustrate methods of operation of a pixel circuit (such as pixel circuit 300) and corresponding imager components (described further in reference to FIG. 8, below), where signals are applied to operate components of the pixel circuit. An imager control circuit 1076 (FIG. 8) may be configured to control the row and column driver circuitry 1072, 1078 such that driving voltage may be applied to gate SG of storage transistor 310 and gate TX of transfer transistor 320 (FIG. 3), as well as gate AB of optional anti-blooming transistor 360. Gates SG, TX, and RS may be configured for rolling shutter operation or global shutter operation. However, the methods described below are not limited to embodiments where operation is controlled by a control circuit, and may operate according to any device or process for controlling the operation of the pixel circuit and corresponding imager components known to those in the art.

Figure 4:
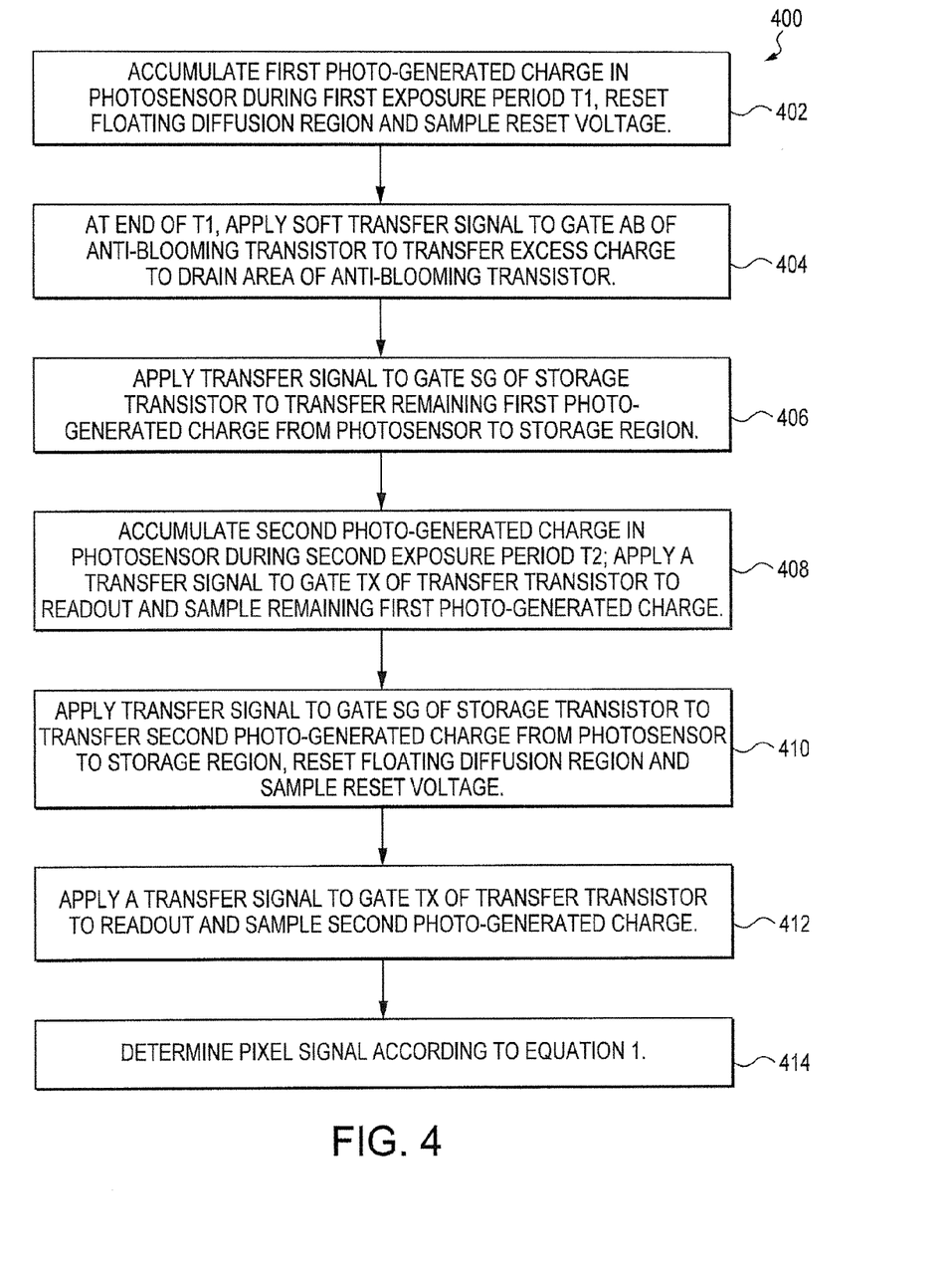
FIG. 4 illustrates a method of operating a pixel circuit having a storage transistor and an anti-blooming transistor for improved high-dynamic operation, in accordance with an embodiment described herein.
Figure 5:
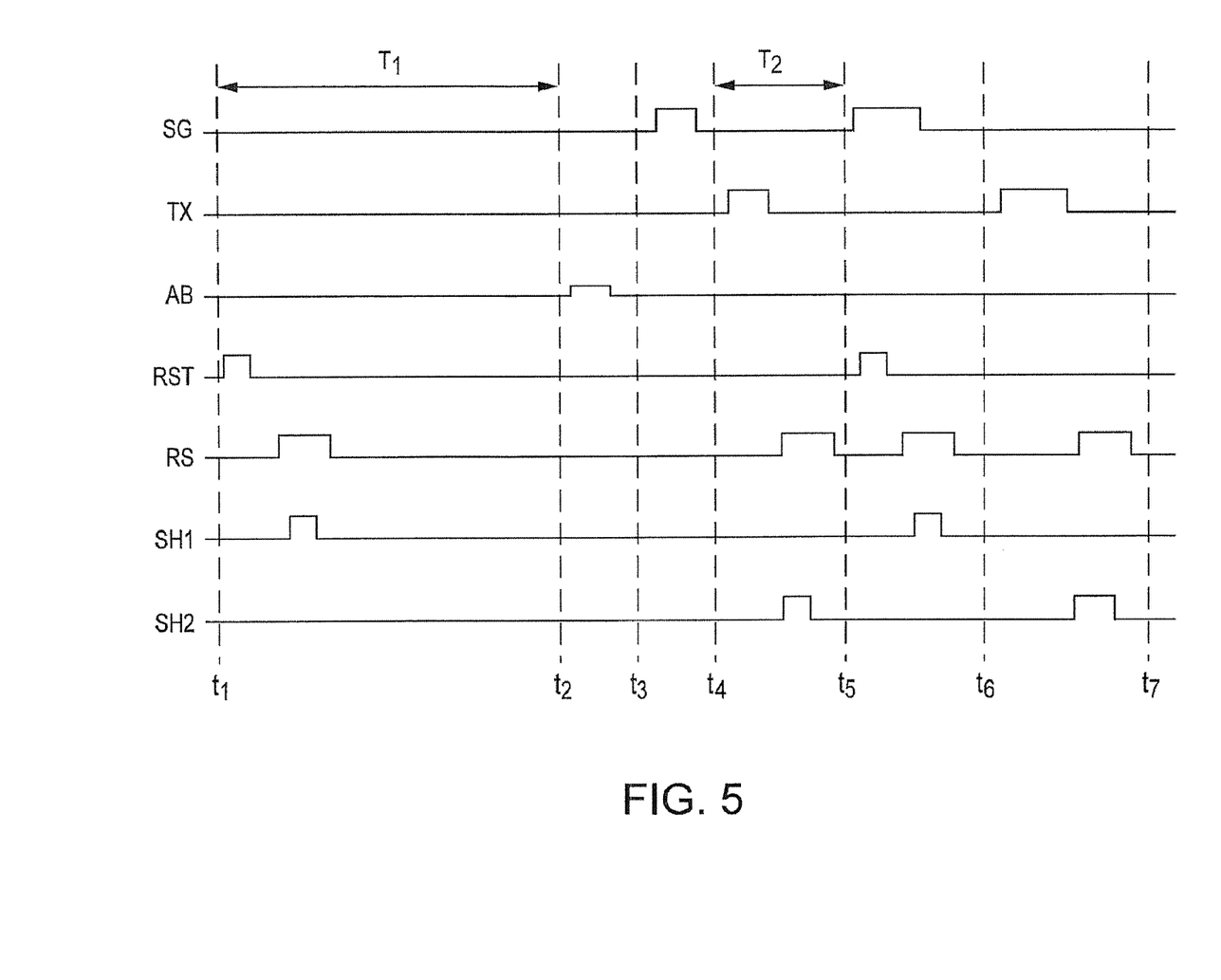
FIG. 5 illustrates a timing diagram for operation of a pixel circuit in accordance with the method described in FIG. 4.

FIG. 4 illustrates a method 400 of operating pixel circuit 300 in a lateral overflow mode. FIG. 5 shows a timing diagram of pixel circuit 300 corresponding to operation of pixel circuit 300 according to the lateral overflow mode of method 400.

In step 402 of method 400 (FIG. 4), a first photo-generated charge is accumulated at photosensor 302 during a first exposure period T1. First exposure period T1 has a longer duration than a subsequent second exposure period T2, described further below. For example, first exposure period T1 may be twice as long as second exposure period T2. As shown in FIG. 5, during first exposure period T1 (lasting from time $t_1$ to time $t_2$), gates SG, AB, and TX are off.

The first photo-generated charge is accumulated until an end of first exposure period T1, at which point, as shown in step 404, a "soft transfer" signal is applied to gate AB (FIG. 5) of anti-blooming transistor 360. The soft transfer signal is a voltage less than the amount required to fully allow charge transfer across anti-blooming transistor 360, thus creating a minimum threshold voltage $V_{TH}$ for an amount of voltage to be transferred to the drain region of anti-blooming transistor 360. If the first photo-generated charge stored in photosensor 302 is below the threshold voltage $V_{TH}$, no charge will be transferred across anti-blooming transistor 360. If the first photo-generated charge stored in photosensor 302 is greater than the threshold voltage $V_{TH}$, an excess portion of the first photo-generated charge stored in photosensor 302 will be transferred to the drain region of anti-blooming transistor 360, for example to array pixel supply voltage $V_{AA}$.

In step 406, the remaining portion (referred to as charge V1) of the first photo-generated charge (i.e., either the original first photo-generated charge if the photo-generated charge is less than the threshold voltage $V_{TH}$ or, if the original photo-generated charge is greater than the threshold voltage $V_{TH}$, a portion approximately equal to the threshold voltage $V_{TH}$) is transferred to the storage region by applying a signal (i.e., a "storage signal") to the gate SG (FIG. 5) of storage transistor 310. Gate SG may be configured for global shutter operation.

Also during step 406, (or, alternatively, during steps 402, 404, or more than one of steps 402, 404, 406), floating diffusion region 306 is reset by applying a reset signal to reset gate RST, and the pixel reset signal $V_{OPIX\_RST}$ is sampled by amplifying the reset voltage stored in the floating diffusion region 306 across source-follower transistor 340, selecting the pixel circuit for output by applying a transfer signal to gate RS of row-select transistor 350, and outputting the pixel reset signal $V_{OPIX\_RST\_1}$ onto column line 308. The pixel reset signal $V_{OPIX\_RST\_1}$ is sampled by sample and hold circuit 1082 (FIG. 8) by activating a first sample and hold signal SH1, as shown in FIG. 5.

Figure 8:
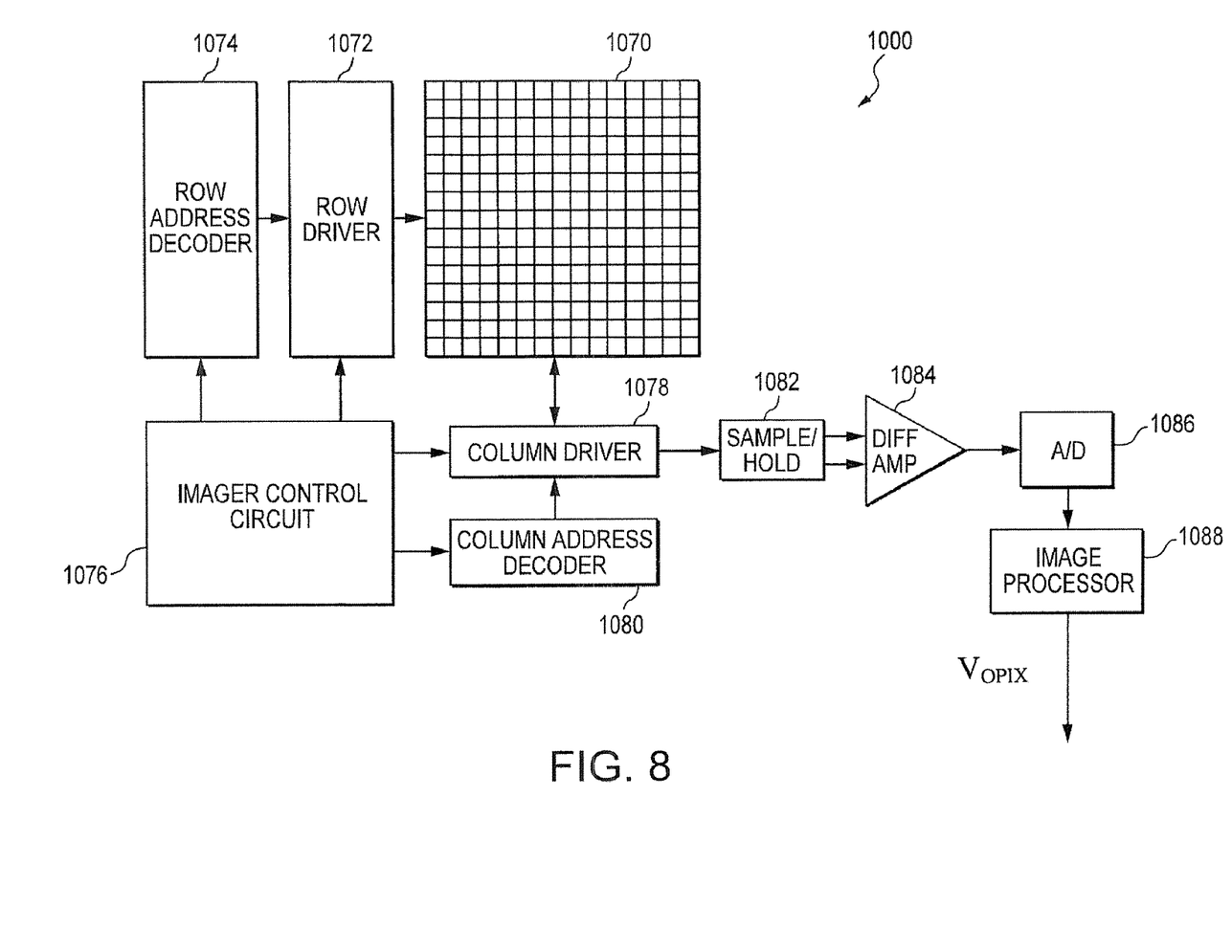
FIG. 8 is a block diagram of an imager, according to disclosed embodiments.

In step 408, charge V1 is sampled by applying a signal (i.e., a "transfer signal") to the gate TX of transfer transistor 320 to transfer charge VI to floating diffusion region 306, amplifying charge V1 across source-follower transistor 340, selecting pixel circuit 300 for output by applying a signal to gate RS of row-select transistor 350, and outputting charge V1 onto column line 308. The sample and hold circuit 1082 (FIG. 8) stores amplified first pixel signal $V_{OPIX\_SIG1}$ by activating a second sample and hold signal SH2, as shown in FIG. 5, and outputs the differential voltage signal $V_{OPIX\_DIF1}=(V_{OPIX\_RST\_1}-V_{OPIX\_SIG1})$ to an analog-to-digital converter 1086 (FIG. 8). Analog-to-digital converter 1086 digitizes the differential signal $V_{OPIX\_DIF1}$, and supplies the digitized pixel signal $V_{OPIX\_DIF1}$ to an image processor 1088 (FIG. 8). If the original first photo-generated charge in photosensor 302 was less than the threshold voltage $V_{TH}$, differential signal $V_{OPIX\_DIF1}$ represents a true sampling voltage corresponding to the amount of light detected at the photosensor 302. If the original first photo-generated charge in photosensor 302 was greater than the threshold voltage $V_{TH}$ (and thus the amount in excess of threshold voltage $V_{TH}$ was transferred across anti-blooming transistor 360 during step 404), differential signal $V_{OPIX\_DIF1}$ represents a sampling voltage corresponding to the threshold voltage $V_{TH}$.

Also in step 408, and concurrently with the transfer and sampling of charge $V_{OPIX\_DIF1}$, a second photo-generated charge (referred to as V2) is accumulated at photosensor 302 during a second exposure period T2. As shown in FIG. 5, second exposure period T2 has a shorter duration than first exposure period T1 (for example, T2 may be one half as long as T1), and, thus, typically less charge is accumulated on photosensor 302 during second exposure period T2, and photosensor 302 is less likely to reach a saturation point. Because photosensor 302 will typically not reach a saturation point during second exposure period T2, the "soft transfer" signal is not applied to gate AB (FIG. 5) of anti-blooming transistor 360 during or immediately after second exposure period T2.

In step 410, the second photo-generated charge V2 is transferred to the storage region 304 by applying a signal to the gate SG of storage transistor 310. Also during step 410, floating diffusion region 306 is reset by activating gate RST of reset transistor 330 (FIG. 5), and the pixel reset signal $V_{OPIX\_RST\_2}$ is sampled by amplifying the reset voltage stored in the floating diffusion region 306 across source-follower transistor 340, selecting the pixel circuit for output by applying a signal to gate RS of row-select transistor 350, and outputting the pixel reset signal $V_{OPIX\_RST\_2}$ onto column line 308. The pixel reset signal $V_{OPIX\_RST\_2}$ is sampled by sample and hold circuit 1082 (FIG. 8) by activating first sample and hold signal SH1, as shown in FIG. 5.

In step 412, the second photo-generated charge V2 is sampled, similar to a typical linear pixel, by transferring charge V2 to floating diffusion region 306 by applying a signal to gate TX of transfer transistor 320, amplifying charge V2 stored in the floating diffusion region 306 across source-follower transistor 340, selecting the pixel circuit for output by applying a signal to gate RS of row-select transistor 350, and outputting charge V2 onto column line 308. The sample and hold circuit 1082 (FIG. 8) stores amplified second pixel reset signal $V_{OPIX\_SIG2}$ by activating second sample and hold signal SH2, as shown in FIG. 5, and the differential voltage signal $V_{OPIX\_DIF2}=(V_{OPIX\_RST\_2}-V_{OPIX\_SIG2})$ is output to an analog-to-digital converter 1086 (FIG. 8). Analog-to-digital converter 1086 digitizes the differential signal $V_{OPIX\_DIF2}$, and supplies the digitized pixel signal to an image processor 1088 (FIG. 8).

In step 414, image processor 1088 (FIG. 8) determines the pixel value $V_{OPIX}$ according Equation 1:

$$\begin{bmatrix} \text{If } V_{OPIX\_DIF1} < V_{TH\_MIN} \rightarrow V_{OPIX} = V_{OPIX\_DIF1}; \\ \text{If } V_{OPIX\_DIF1} \geq V_{TH\_MIN}, \text{ and} \\ N*V_{OPIX\_DIF2} < V_{OPIX\_DIF1} \rightarrow V_{OPIX} = V_{OPIX\_DIF1}; \\ \text{If } V_{OPIX\_DIF1} \geq V_{TH\_MIN}, \text{ and} \\ N*V_{OPIX\_DIF2} \geq V_{OPIX\_DIF1} \rightarrow V_{OPIX} = N*(V_{OPIX\_DIF2} - V_{OPIX\_DIF1}), \end{bmatrix}$$ Equation 1 where N is the ratio of exposure periods T1/T2, and $V_{TH\_MIN}$ is a minimum threshold voltage of pixel circuit 300 (FIG. 3). As shown in Equation 1, the calculated pixel signal $V_{OPIX}$ is not directly affected by the threshold voltage $V_{TH}$ resulting from the anti-blooming transistor 360. Rather, if there is no saturation of photosensor 302 during first exposure period T1, $V_{OPIX}=V_{OPIX\_DIF1}$. There is no saturation of photosensor 302 during first exposure period T1 if $V_{OPIX\_DIF1}$ is less than minimum threshold voltage $V_{TH\_MIN}$. There is also no saturation of photosensor 302 during exposure period T1 if $V_{OPIX\_DIF1}$ is greater than minimum threshold voltage $V_{TH\_MIN}$, but the normalized value of $V_{OPIX\_DIF2}$ (i.e., $N*V_{OPIX\_DIF2}$) is less than $V_{OPIX\_DIF1}$, because this indicates that photosensor 302 continued to generate charge during the entirety of exposure period T1.

If, however, the normalized value of $V_{OPIX\_DIF2}$ (i.e., $N*V_{OPIX\_DIF2}$) is greater than $V_{OPIX\_DIF1}$, this indicates that saturation did occur in photosensor 302 during first exposure period Ti, and sampled voltage $V_{OPIX\_DIF1}$ represents the threshold voltage $V_{TH}$ of photosensor 302 resulting from anti-blooming transistor 360. The difference of the sampled voltages $V_{OPIX\_DIF1}$ and $V_{OPIX\_DIF2}$ are thus normalized for the first exposure period T1. There is no need for calibration of the threshold voltage $V_{TH}$, as required in lateral overflow methods of the prior art. Also, because V1 is sampled during the second exposure period T2, the total operating time is less than double exposure modes known in the art. In an alternative embodiment, pixel value $V_{OPIX}$ may be determined in the analog domain, prior to digitizing differential signals $V_{OPIX\_DIF1,2}$.

Figure 6:
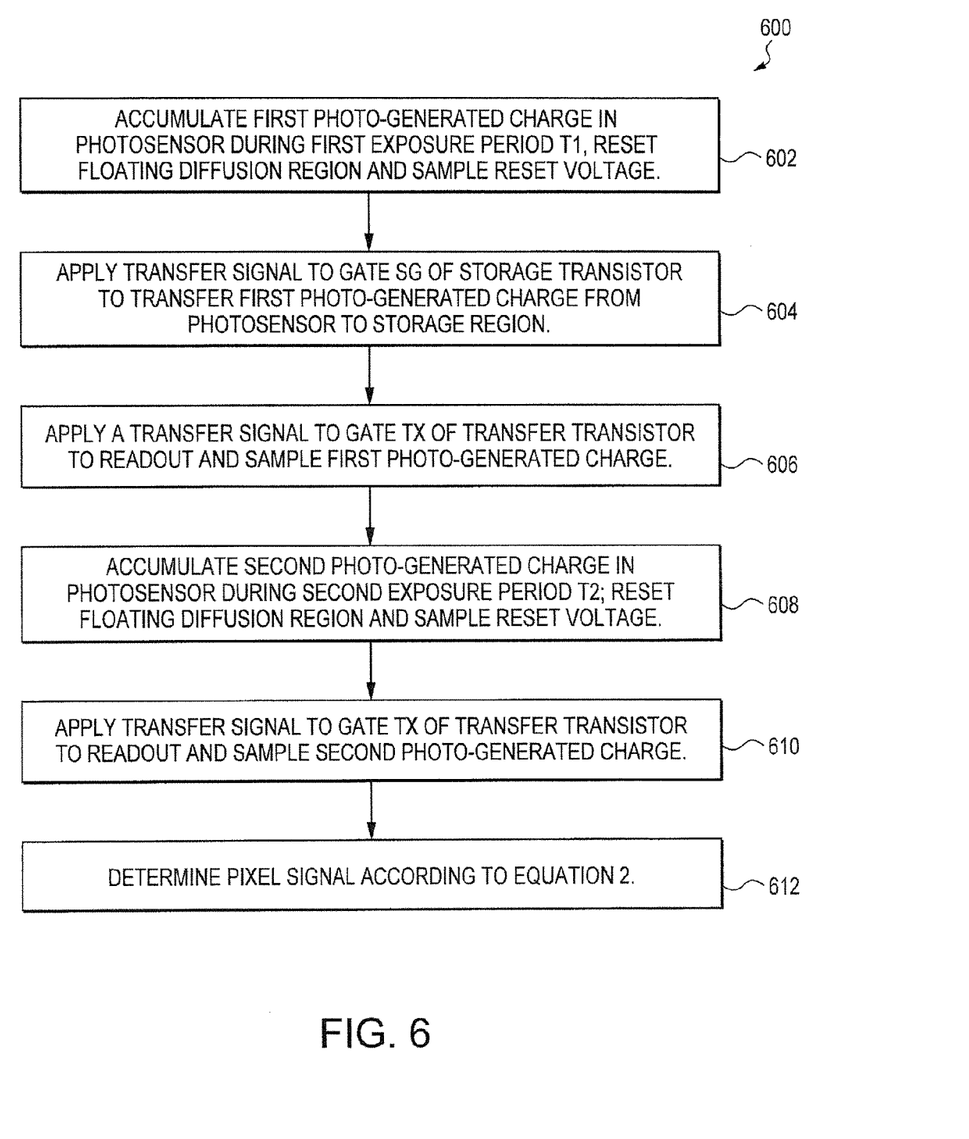
FIG. 6 illustrates a method of operating a pixel circuit having a storage transistor for improved high-dynamic operation, in accordance with an embodiment described herein.
Figure 7:
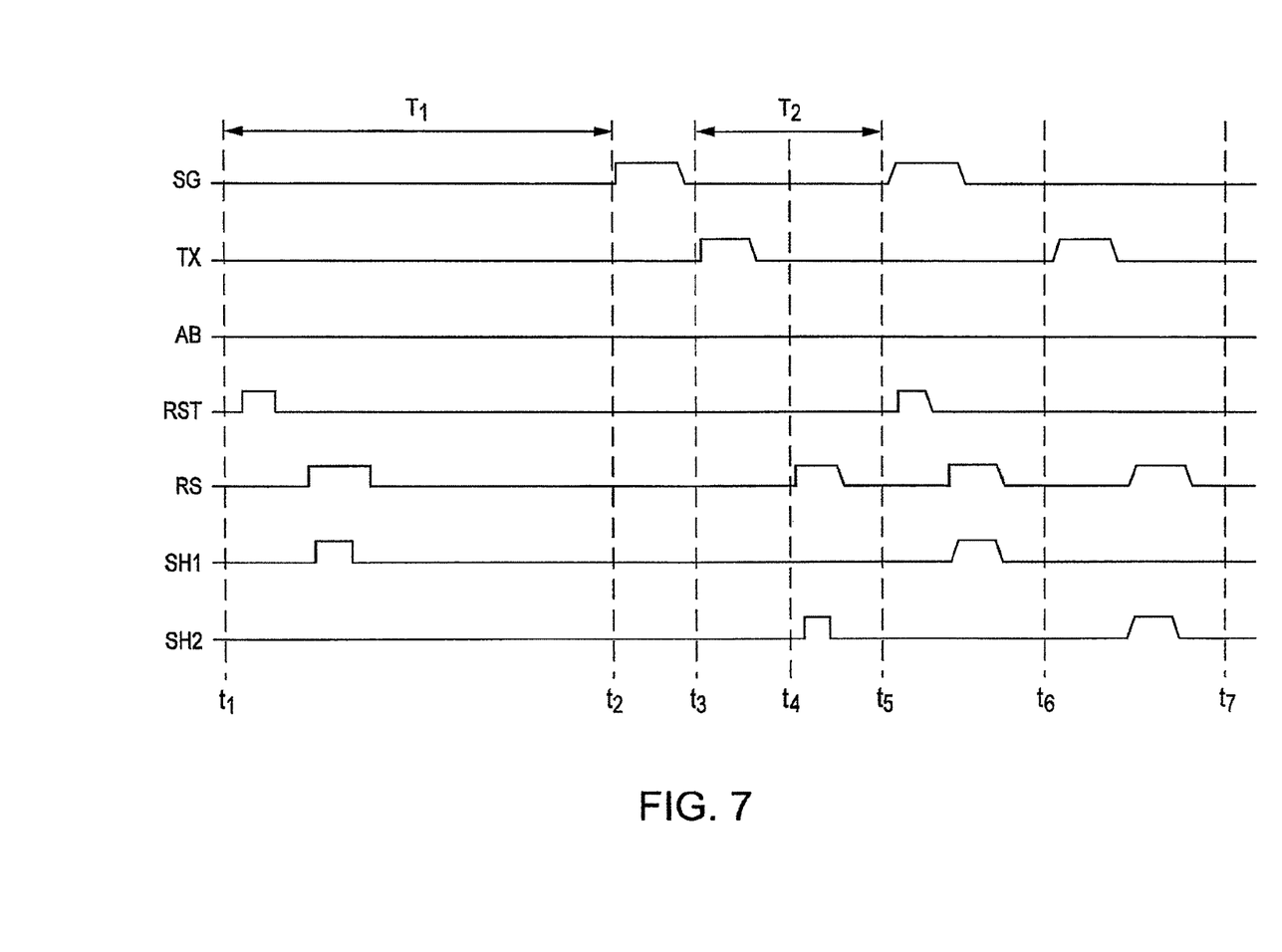
FIG. 7 illustrates a timing diagram for operation of a pixel circuit in accordance with the method described in FIG. 6.

FIG. 6 illustrates a second method 600 of operating pixel circuit 300 in a double exposure mode. FIG. 7 shows a timing diagram of pixel circuit 300 corresponding to the operation according to the double exposure mode of method 600. While anti-blooming transistor 360 is not necessary for the double exposure mode of method 600, embodiments of pixel circuit 300 configured to operate according to double exposure mode of method 600 may also include anti-blooming transistor 360, which remains off as shown in FIG. 7, to provide flexibility of operation, such as the option of being configured to operate according to the lateral overflow mode of method 400.

In step 602 of method 600 (FIG. 6), a first photo-generated charge is accumulated at photosensor 302 during a first exposure period T1. First exposure period T1 is a longer exposure period than a subsequent second exposure period T2, described further below. For example, first exposure period T1 may be twice as long as second exposure period T2. During T1, gates SG, AB, and TX are off, as shown in FIG. 7.

Also during step 602 (or during step 604, described below), floating diffusion region 306 is reset by applying a reset signal to reset gate RST, and the pixel reset signal $V_{OPIX\_RST\_1}$ is sampled by amplifying the reset voltage stored in the floating diffusion region 306 across source-follower transistor 340, selecting pixel circuit 300 for output by applying a signal to gate RS of row-select transistor 350, and outputting the pixel reset signal $V_{OPIX\_RST\_1}$ onto column line 308. The pixel reset signal $V_{OPIX\_RST\_1}$ is sampled and stored by sample and hold circuit 1082 (FIG. 8) by activating a first sample and hold signal SH1, as shown in FIG. 7.

In step 604 of method 600, a signal (i.e., a "storage signal") is applied to gate SG (FIG. 7) of storage transistor 310 to transfer the first photo-generated charge (referred to as charge V1) from photosensor 302 to storage region 304. Gate SG may be configured for global shutter operation.

In step 606, charge V1 is sampled by applying a signal (i.e., a "transfer signal") to gate TX of transfer transistor 320 to transfer charge V1 to floating diffusion region 306, amplifying charge V1 across source-follower transistor 340, selecting pixel circuit 300 for output by applying a signal to gate RS of row-select transistor 350, and outputting charge a signal $V_{OPIX\_SIG1}$ representing charge V1 onto column line 308. The sample and hold circuit 1082 (FIG. 8) stores amplified first pixel signal $V_{OPIX\_SIG1}$ by activating a second sample and hold signal SH2, as shown in FIG. 7, and outputs differential voltage signal $V_{OPIX\_DIF1} = (V_{OPIX\_RST\_1} - V_{OPIX\_SIG1})$ to an analog-to-digital converter 1086 (FIG. 8). Analog-to-digital converter 1086 digitizes the differential signal $V_{OPIX\_DIF1}$, and supplies the digitized pixel signal $V_{OPIX\_DIF1}$ to an image processor 1088 (FIG. 8).

Also during step 606, and concurrently with the transfer and sampling of $V_{OPIX\_SIG1}$, a second photo-generated charge (referred to as V2) is accumulated at photosensor 302 during a second exposure period T2. As shown in FIG. 7, second exposure period T2 has a shorter duration than first exposure period T1, and, thus, typically less charge is accumulated on photosensor 302 during second exposure period T2.

In step 608, the second photo-generated charge V2 is transferred to the storage region 310 by applying a signal to the gate SG of storage transistor 310. Also during step 608, floating diffusion region 306 is reset by activating gate RST of reset transistor 330, and the pixel reset signal $V_{OPIX\_RST\_2}$ is sampled by amplifying the reset voltage stored in the floating diffusion region 306 across source-follower transistor 340, selecting pixel circuit 300 for output by applying a signal to gate RS of row-select transistor 350, and outputting the pixel reset signal $V_{OPIX\_RST\_2}$ onto column line 308. The pixel reset signal $V_{OPIX\_RST\_2}$ is sampled and stored by sample and hold circuit 1082 (FIG. 8) by activating first sample and hold signal SH1, as shown in FIG. 7.

In step 610, the second photo-generated charge V2 is sampled, similar to a typical linear pixel, by applying a signal to gate TX of transfer transistor 320 to transfer charge V2 to floating diffusion region 306, amplifying charge V2 across source-follower transistor 340, selecting pixel circuit 300 for output by applying a signal to gate RS of row-select transistor 350, and outputting charge V2 onto column line 308. The sample and hold circuit 1082 (FIG. 8) stores amplified second pixel reset signal $V_{OPIX\_SIG1}$ by activating second sample and hold signal SH2, as shown in FIG. 7, and the differential voltage signal $V_{OPIX\_DIF2} = (V_{OPIX\_RST\_2} - V_{OPIX\_SIG2})$ is output to an analog-to-digital converter 1086 (FIG. 8). Analog-to-digital converter 1086 digitizes the differential signal $V_{OPIX\_DIF2}$, and supplies the digitized pixel signal to an image processor 1088 (FIG. 8).

In step 612, image processor 1088 determines the pixel value $V_{OPIX}$ according Equation 2:

$$\begin{bmatrix} \text{If } V_1 < V_{TH\_MIN} \rightarrow V_{OPIX} = V_{OPIX\_DIF1}; \\ \text{If } V_1 \geq V_{TH\_MIN}, \text{ and} \\ N*V_2 < V_1 \rightarrow V_{OPIX} = V_{OPIX\_DIF1}; \\ \text{If } V_1 \geq V_{TH\_MIN}, \text{ and} \\ N*V_2 \geq V_1 \rightarrow V_{OPIX} = N*(V_{OPIX\_DIF2}), \end{bmatrix} \quad \text{Equation 2}$$

where N is the ratio of exposure periods T1/T2, and $V_{TH\_MIN}$ is a minimum threshold voltage of pixel circuit 300 (FIG. 3). Thus, as shown in Equation 2, if there is no saturation of photosensor 302 during first exposure period T1, $V_{OPIX} = V_{OPIX\_DIF1}$. There is no saturation of photosensor 302 during first exposure period T1 if $V_{OPIX\_DIF1}$ is less than minimum threshold voltage $V_{TH\_MIN}$. There is also no saturation of photosensor 302 during exposure period T1 if $V_{OPIX\_DIF1}$ is greater than minimum threshold voltage $V_{TH\_MIN}$, but the normalized value of $V_{OPIX\_DIF2}$ (i.e., $N*V_{OPIX\_DIF2}$) is less than $V_{OPIX\_DIF1}$, because this indicates that photosensor 302 continued to generate charge during the entirety of exposure period T1.

If, however, the normalized value of $V_{OPIX\_DIF2}$ (i.e., $N*V_{OPIX\_DIF2}$) is greater than $V_{OPIX\_DIF1}$, this indicates that saturation did occur in photosensor 302 during first exposure period T1. The sampled voltage $V_{OPIX\_DIF2}$ corresponding to second photo-generated charges V2 is normalized for the first exposure period T1. Therefore, there is no need for line buffers and non-overlapping sampling of charges generated in the two exposure periods, as required in double exposure modes of the prior art. In an alternative embodiment, pixel value $V_{OPIX}$ may be determined in the analog domain, prior to digitizing differential signals $V_{OPIX\_DIF1,2}$.

The methods of operation 400, 600 provide for high-dynamic range operation of pixel circuit 300. Pixel circuit 300 and associated methods of use (including methods 400 and 600) may be implemented as part of an imager or imager system. FIG. 8 illustrates a block diagram of a CMOS imager 1000 having a pixel array 1070 including a plurality of pixels arranged in a predetermined number of columns and rows. Each pixel (at least one of which include a photosensor 302, storage region 304, storage transistor 310, transfer transistor 320, and, optionally, anti-blooming transistor 360, as shown in FIG. 3) also has corresponding readout circuitry, as shown in pixel circuit 300 of FIG. 3. Alternatively, pixels may share readout circuitry, such as in a common element pixel array ("CEPA") configuration, as is known in the art. Pixel circuits in pixel array 1070 are configured in accordance with any embodiment described above.

Pixel values of pixel array 1070, generated as described above in one of methods 400 and 600, are output row-by-row as activated by the control signals from row driver 1072 in response to a row address decoder 1074. Column driver 1078 and column address decoder 1080 are also used to selectively activate individual pixel columns, by applying signals to gate RS of respective row select transistors 350 (FIG. 3). An imager control circuit 1076 controls the address decoders 1074, 1080 for selecting the appropriate row and column lines for pixel value readout. The control circuit 1076 also controls the row and column driver circuitry 1072, 1078 such that driving voltage may be applied to gate SG of storage transistor 310 and gate TX transfer transistor 320 (FIG. 3), as well as gate AB of optional anti-blooming transistor 360. Gates SG, TX, and RS may be configured for rolling shutter operation or global shutter operation.

As described above with respect to methods 400 and 600, the readout circuitry associated with each pixel outputs both reset signals $V_{OPIX\_RST\_1,2}$ and respective first and second sampled charges $V_{OPIX\_SIG1,2}$ in embodiments described above. The outputs are sampled, held and amplified by a sample and hold circuit 1082 according to a correlated double sampling ("CDS") scheme. The sample and hold circuit 1082 outputs amplified pixel reset and image signals $V_{OPIX\_RST1}$, $V_{OPIX\_SIG1}$, $V_{OPIX\_RST2}$, $V_{OPIX\_SIG2}$. The difference $V_{OPIX\_DIF1,2} = (V_{OPIX\_RST1,2} - V_{OPIX\_SIG1,2})$ between each respective output $V_{OPIX\_RST1,2}$ and $V_{OPIX\_SIG1,2}$ represents the actual pixel output with common-mode noise eliminated. The differential signals $V_{OPIX\_DIF1,2}$ are produced by differential amplifier 1084 for each voltage read out from pixel array 1070. The differential signals are digitized by analog-to-digital converter 1086. The analog-to-digital converter 1086 supplies the digitized pixel signals to image processor 1088, which determines each pixel value $V_{OPIX\_SIG}$ according to either Equation 1 or Equation 2 described above in relation to methods 400 and 600, respectively, and forms and outputs a digital image.

Imager 1000 and associated methods of use described above may be used in any system that employs a CMOS imager device, including, but not limited to a computer system, camera system, scanner, machine vision, vehicle navigation, video telephone, surveillance system, automatic focus system, star tracker system, motion detection system, image stabilization system, and other imaging systems. Example digital camera systems in which the above embodiments may be used include both still and video digital cameras, cellular telephone cameras, handheld personal digital assistant (PDA) cameras, and other types of cameras.

Figure 9:
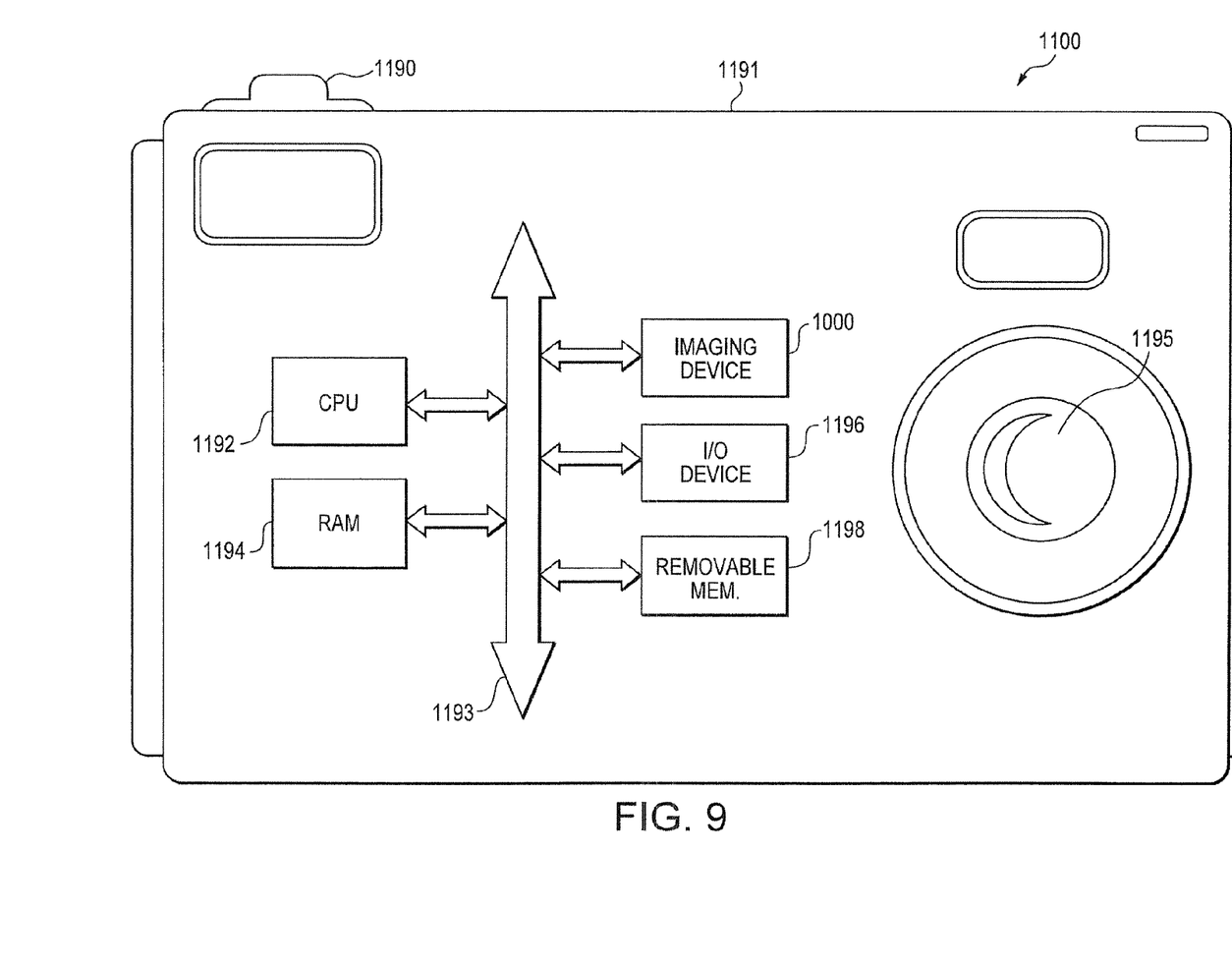
FIG. 9 is a block diagram of a camera system, according to disclosed embodiments.

FIG. 9 shows one such system 1100, which is part of a digital camera 1191. The system 1100 includes imager 1000, which includes a pixel array having at least one pixel circuit, such as pixel circuit 300, configured for operation according to at least one of methods 400 and/or 600, as described above. System 1100 generally comprises a processing unit 1192, such as a microprocessor, that controls system functions and which communicates with an input/output (I/O) device 1196 over a bus 1193. Imager 1000 also communicates with the processing unit 1192 over the bus 1193. The system 1100 also includes random access memory (RAM) 1194, and can include removable memory 1198, such as flash memory, which also communicates with the processing unit 1192 via the bus 1193. Lens 1195 focuses an image on a pixel array 1070 of the imager 1000 when shutter release button 1190 is pressed.

The system 1100 could alternatively be part of a larger processing system, such as a computer. Through the bus 1193, the system 1100 illustratively communicates with other computer components, including but not limited to, a hard drive (not shown) and/or one or more removable media devices 1198. Imager 1000 may be combined with a processor, such as a central processing unit, digital signal processor, or microprocessor, with or without memory storage on a single integrated circuit or on a different chip than the processor.

What is claimed as new and desired to be protected by Letters Patent of the United States is:

1. A method of operating a pixel circuit comprising:
generating a first photo-generated charge in at least one photoconversion region during a first exposure period;
transferring at least a portion of said first photo-generated charge to a first storage region;
generating a second photo-generated charge in said at least one photoconversion region during a second exposure period;
transferring said at least a portion of said first photo-generated charge to a second storage region;
sampling said at least a portion of said first photo-generated charge during said second exposure period;
transferring said second photo-generated charge to said second storage region; and
sampling said second photo-generated charge.

2. The method of claim 1, wherein said first exposure time is longer than said second exposure time.

3. The method of claim 1, further comprising:
prior to transferring said at least a portion of said first photo-generated charge to said storage region, transferring an excess portion of said first photo-generated charge above a threshold voltage to an opposite-charged region.

4. The method of claim 1, further comprising:
determining an output pixel signal with a processor according to whether said photoconversion region is saturated during said first exposure period.

5. The method of claim 4, wherein said output pixel signal is a sampled pixel signal corresponding to said first photo-generated charge when said photoconversion region is not saturated during said first exposure period.

6. The method of claim 4, wherein said output pixel signal is a normalized pixel signal corresponding to said second photo-generated charge when said photoconversion region is saturated during said first exposure period.

7. The method of claim 4, wherein said output pixel signal is a normalized pixel signal corresponding to said second photo-generated charge and said at least a portion of said first photo-generated charge when said photoconversion region is saturated during said first exposure period.

8. The method of claim 3, further comprising:
determining an output pixel signal with a processor according to whether said photoconversion region is saturated during said first exposure period, wherein said processors determines said output pixel signal according to Equation 1:

$$\begin{bmatrix} \text{If } V_{OPIX\_DIF1} < V_{TH\_MIN} \rightarrow V_{OPIX} = V_{OPIX\_DIF1}; \\ \text{If } V_{OPIX\_DIF1} \geq V_{TH\_MIN}, \text{ and} \\ N * V_{OPIX\_DIF2} < V_{OPIX\_DIF1} \rightarrow V_{OPIX} = V_{OPIX\_DIF1}; \\ \text{If } V_{OPIX\_DIF1} \geq V_{TH\_MIN}, \text{ and} \\ N * V_{OPIX\_DIF2} \geq V_{OPIX\_DIF1} \rightarrow V_{OPIX} = N * (V_{OPIX\_DIF2} - V_{OPIX\_DIF1}), \end{bmatrix} \quad \text{Equation 1}$$

wherein $V_{OPIX}$ is said output pixel signal, $V_{OPIX\_DIF1}$ is said sampled at least a portion of said first photo-generated charge, $V_{TH\_MIN}$ is a minimum threshold voltage of said pixel circuit, $V_{OPIX\_DIF2}$ is said sampled second photo-generated charge, and N is the ratio of said first exposure period and said second exposure period.

9. The method of claim 1, further comprising:
determining an output pixel signal with a processor according to whether said photoconversion region is saturated during said first exposure period, wherein said processor determines said output pixel signal according to Equation 2:

$$\begin{bmatrix} \text{If } V_1 < V_{TH\_MIN} \rightarrow V_{OPIX} = V_{OPIX\_DIF1}; \\ \text{If } V_1 \geq V_{TH\_MIN}, \text{ and} \\ N * V_2 < V_1 \rightarrow V_{OPIX} = V_{OPIX\_DIF1}; \\ \text{If } V_1 \geq V_{TH\_MIN}, \text{ and} \\ N * V_2 \geq V_1 \rightarrow V_{OPIX} = N * (V_{OPIX\_DIF2}), \end{bmatrix} \quad \text{Equation 2}$$

wherein $V_{OPIX}$ is said output pixel signal, $V_{OPIX\_DIF1}$ is said sampled at least a portion of said first photo-generated charge, $V_{TH\_MIN}$ is a minimum threshold voltage of said pixel circuit, $V_{OPIX\_DIF2}$ is said sampled second photo-generated charge, and N is the ratio of said first exposure period and said second exposure period.

10. The method of claim 1, wherein sampling said first and second photo-generated charges further comprises performing correlated double sampling of said at least a portion of said first photo-generated charge and said second photo-generated charges.

11. A pixel circuit comprising:
a photoconversion region for generating a first photo-generated charge during a first exposure period and a second photo-generated charge during a second exposure period;
a storage transistor connecting said photoconversion region to a first storage region;
a transfer transistor connecting said first storage region to a second storage region; and
readout circuitry configured to readout a first voltage corresponding to at least a portion of said first photo-generated charge and a second voltage corresponding to said second photo-generated charge,
wherein:
said storage transistor is configured to transfer the at least a portion of said first photo-generated charge to said first storage region after said first exposure period;
said transfer transistor is configured to transfer the at least a portion of said first photo-generated charge to said second storage region;
said storage transistor is configured to transfer said second photo-generated charge to said first storage region after said second exposure period;
said transfer transistor is configured to transfer said second photo-generated charge to said second storage region; and
said readout circuitry is configured to perform correlated double sampling of said first and second photo-generated charges.

12. The pixel circuit of claim 11, further comprising:
an anti-blooming transistor connecting said photoconversion region to a drain region, said anti-blooming transistor being configured to transfer an excess portion of said first photo-generated charge after said first exposure period.

13. The pixel circuit of claim 12, wherein said anti-blooming transistor is configured to partially open transfer said excess portion.

14. The pixel circuit of claim 13, wherein said anti-blooming transistor is configured to retain substantially all of said first photo-generated charge in said photoconversion region when partially open if said first photo-generated charge is less than or equal to a threshold voltage.

15. The pixel circuit of claim 13, wherein said anti-blooming transistor is configured to retain a first portion of said first photo-generated charge that is approximately equal to a threshold voltage, and transfer a second portion of said first photo-generated charge that is approximately equal to an amount of said first photo-generated charge in excess of said threshold voltage to said opposite-charged drain region if said first photo-generated charge is greater than a threshold voltage.

16. The pixel circuit of claim 14, wherein said threshold voltage corresponds to a level of an anti-blooming signal received at a gate of said anti-blooming transistor.

17. The pixel circuit of claim 11, wherein said readout circuitry is configured to readout said first photo-generated charge during said second integration period.

18. The pixel circuit of claim 11, wherein said pixel circuit is configured to operate according to a double exposure mode.

19. The pixel circuit of claim 12, wherein said pixel circuit is configured to operate according to a lateral overflow mode.

20. An imager comprising:
a pixel circuit including:
a photoconversion region for generating a first photo-generated charge during a first exposure period and a second photo-generated charge during a second exposure period;
a storage transistor connecting said photoconversion region to a first storage region;
a transfer transistor connecting said first storage region to a second storage region; and
readout circuitry configured to readout a first voltage corresponding to at least a portion of said first photo-generated charge and a second voltage corresponding to said second photo-generated charge;
a processor configured to determine and output a pixel signal corresponding to said first and second photo-generated charges; and
a control circuit electrically connected to said pixel circuit, said control circuit configured to provide:
a first storage signal to a gate of said storage transistor to transfer the at least a portion of said first photo-generated charge to said first storage region after said first exposure period;
a first transfer signal to a gate of said transfer transistor to transfer the at least a portion of said first photo-generated charge to said second storage region;
first readout signals to said readout circuitry providing correlated double sampling of the at least a portion of said first photo-generated charge;
a second storage signal to said gate of said storage transistor to transfer said second photo-generated charge to said first storage region after said second exposure period;
a second transfer signal to said gate of said transfer transistor to transfer said second photo-generated charge to said second storage region; and
second readout signals to said readout circuitry providing correlated double sampling of said second photo-generated charge.

21. The imager of claim 20, wherein said processor is configured to output a pixel signal according to said first photo-generated charge when said photoconversion region is not saturated during said first exposure period.

22. The imager of claim 20, wherein said processor is configured to output a normalized pixel signal according to said second photo-generated charge when said photoconversion region is saturated during said first exposure period.

23. The imager of claim 20, wherein said processor is configured to output a normalized pixel signal according to said first and second photo-generated charges when said photoconversion region is saturated during said first exposure period.

24. The imager of claim 20, wherein said processor is configured to output a pixel signal according to Equation 2:

$$\begin{bmatrix} \text{If } V_1 < V_{TH\_MIN} \rightarrow V_{OPIX} = V_{OPIX\_DIF1}; \\ \text{If } V_1 \geq V_{TH\_MIN}, \text{ and} \\ N*V_2 < V_1 \rightarrow V_{OPIX} = V_{OPIX\_DIF1}; \\ \text{If } V_1 \geq V_{TH\_MIN}, \text{ and} \\ N*V_2 \geq V_1 \rightarrow V_{OPIX} = N*(V_{OPIX\_DIF2}), \end{bmatrix} \quad \text{Equation 2}$$

wherein $V_{OPIX}$ is said output pixel signal, $V_{VOPIX\_DIF1}$ is the sampled at least a portion of said first photo-generated charge, $V_{TH\_MIN}$ is a minimum threshold voltage of said pixel circuit, $V_{OPIX\_DIF2}$ is the sampled second photo-generated charge, and N is the ratio of said first exposure period and said second exposure period.

25. The imager of claim 20, wherein said pixel circuit further comprises an anti-blooming transistor connecting said photoconversion region to a drain region, said control circuit further configured to provide an anti-blooming signal to a gate of said anti-blooming transistor to transfer an excess portion of said first photo-generated charge after said first exposure period, and
said processor is configured to output a pixel signal according to Equation 1:

$$\begin{bmatrix} \text{If } V_{OPIX\_DIF1} < V_{TH\_MIN} \rightarrow V_{OPIX} = V_{OPIX\_DIF1}; \\ \text{If } V_{OPIX\_DIF1} \geq V_{TH\_MIN}, \text{ and} \\ N*V_{OPIX\_DIF2} < V_{OPIX\_DIF1} \rightarrow V_{OPIX} = V_{OPIX\_DIF1}; \\ \text{If } V_{OPIX\_DIF1} \geq V_{TH\_MIN}, \text{ and} \\ N*V_{OPIX\_DIF2} \geq V_{OPIX\_DIF1} \rightarrow V_{OPIX} = N*(V_{OPIX\_DIF2} - V_{OPIX\_DIF1}), \end{bmatrix} \quad \text{Equation 1}$$

wherein $V_{OPIX}$ is said output pixel signal, $V_{VOPIX\_DIF1}$ is the sampled at least a portion of said first photo-generated charge, $V_{TH\_MIN}$ is a minimum threshold voltage of said pixel circuit, $V_{OPIX\_DIF2}$ is the sampled second photo-generated charge, and N is the ratio of said first exposure period and said second exposure period.

26. A method of operating an imager in a lateral-overflow mode, the method comprising:
accumulating a first photo-generated charge in a photosensor during a first exposure period;
transferring an excess portion of said first photo-generated charge to a drain area of an anti-blooming transistor if said first photo-generated charge exceeds a threshold voltage;
transferring a remaining portion of said first photo-generated charge to a first storage region;
accumulating a second photo-generated charge in said photosensor during a second exposure period;
transferring said remaining portion of said first photo-generated charge to a second storage region;
sampling said remaining portion of said first photo-generated charge during said second exposure period;
transferring said second photo-generated charge to said second storage region; and
sampling said second photo-generated charge.

27. The method of claim 26, wherein said remaining portion is substantially equal to said threshold voltage.

28. The method of claim 26, wherein said remaining portion is substantially all of said first photo-generated charge.

29. The method of claim 26, wherein said first exposure time is longer than said second exposure time.

30. The method of claim 29, wherein said first exposure time is approximately twice as long as said second exposure time.

31. The method of claim 26, further comprising:
determining and outputting a first sampled voltage corresponding to said remaining portion of said first photo-generated charge if said photoconversion region is not saturated during said first exposure period.

32. The method of claim 26, further comprising:
determining and outputting a normalized voltage if said photoconversion region is saturated during said first exposure period.

33. The method of claim 32, wherein determining said normalized voltage comprises:
calculating a difference between a second sampled voltage corresponding to said sampled second photo-generated charge and said sampled remaining portion; and
multiplying said difference by a ratio of durations of said first exposure period and said second exposure time.

34. A method of operating an imager in a double exposure mode, the method comprising:
accumulating a first photo-generated charge in a photosensor during a first exposure period;
transferring said first photo-generated charge to a first storage region;
accumulating a second photo-generated charge in said photosensor during a second exposure period;
transferring said first photo-generated charge to a second storage region;
sampling said first photo-generated charge during said second exposure period;
transferring said second photo-generated charge to said second storage region; and
sampling said second photo-generated charge.

35. The method of claim 34, wherein said first exposure time is longer than said second exposure time.

36. The method of claim 34, wherein said first exposure time is approximately twice as long as said second exposure time.

37. The method of claim 34, further comprising:
outputting a first sampled voltage corresponding to said first photo-generated charge if said photoconversion region is not saturated during said first exposure period.

38. The method of claim 34, further comprising:
determining and outputting a normalized voltage if said photoconversion region is saturated during said first exposure period.

39. The method of claim 38, wherein determining said normalized voltage comprises:
multiplying a second sampled voltage corresponding to said second photo-generated charge by a ratio of durations of said first exposure period and said second exposure period.

* * * * *